United States Patent
Mildh et al.

(10) Patent No.: US 12,052,793 B2
(45) Date of Patent: *Jul. 30, 2024

(54) HANDLING OF PERIODIC RADIO ACCESS NETWORK (RAN) BASED NOTIFICATION AREA (RNA) TIMER

(71) Applicant: Telefonaktiebolaget LM Ericsson (publ), Stockholm (SE)

(72) Inventors: Gunnar Mildh, Sollentuna (SE); Icaro L. J. Da Silva, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/314,349

(22) Filed: May 9, 2023

(65) Prior Publication Data

US 2023/0276523 A1 Aug. 31, 2023

Related U.S. Application Data

(63) Continuation of application No. 17/043,980, filed as application No. PCT/IB2019/053150 on Apr. 16, 2019, now Pat. No. 11,659,615.

(Continued)

(51) Int. Cl.
*H04W 76/27* (2018.01)
*H04W 52/02* (2009.01)
*H04W 68/02* (2009.01)

(52) U.S. Cl.
CPC ....... *H04W 76/27* (2018.02); *H04W 52/0212* (2013.01); *H04W 68/02* (2013.01)

(58) Field of Classification Search
None
See application file for complete search history.

(56) References Cited

U.S. PATENT DOCUMENTS 11,659,615 B2 * 5/2023 Mildh ............... H04W 52/0212
370/311
2012/0106370 A1 5/2012 Radulescu et al.
(Continued)

FOREIGN PATENT DOCUMENTS

CN 103797854 B 4/2017
CN 107889274 A 4/2018
(Continued)

OTHER PUBLICATIONS

International Search Report and Written Opinion dated Aug. 8, 2019 issued in PCT Application No. PCT/IB2019/053150, consisting of 12 pages.

(Continued)

*Primary Examiner* — Alex Skripnikov
(74) *Attorney, Agent, or Firm* — Weisberg I.P. Law, P.A.

(57) ABSTRACT

A method and wireless device for handling a periodic RNA update timer are disclosed. A method is implemented in a wireless device (WD) for stopping an update timer based on a condition including that the WD: receives an RRC Setup message triggering transition of the WD to an RRC_CONNECTED state in response to an RRC Resume request message; receives an RRC Suspend message indicating that the WD is to stay in an RRC_INACIVE state in response to an RRC Resume Request message; receives an RRC Release message triggering transition of the WD to an RRC_IDLE state in response to an RRC Resume Request message; fails to receive an RRC Resume message, RRC Suspend message or an RRC Release message after sending an RRC Resume Request message; or the WD enters the RRC_IDLE state from the RRC-INACTIVE state without transitioning through the RRC_CONNECTED state.

18 Claims, 12 Drawing Sheets

Related U.S. Application Data

(60) Provisional application No. 62/657,975, filed on Apr. 16, 2018.

(56) References Cited

U.S. PATENT DOCUMENTS

| | | |
|---|---|---|
| 2017/0027006 A1 | 1/2017 | Vikberg |
| 2018/0220486 A1 | 8/2018 | Tseng et al. |

FOREIGN PATENT DOCUMENTS

| | | |
|---|---|---|
| EP | 2 645 804 A1 | 10/2013 |
| RU | 2476030 C2 | 2/2013 |
| WO | 2017/026464 A1 | 2/2017 |

OTHER PUBLICATIONS

3GPP TS 24.501 V1.0.0 (Mar. 2018) 3rd Generation Partnership Project; Technical Specification Group Core Network and Terminals; Non-Access-Stratum (NAS) Protocol for 5G System (5GS); Stage 3 (Release 15), consisting of 255 pages.
3GPP TS 38.304 V1.0.1 (Apr. 2018) 3rd Generation Partnership Project; Technical Specification Group Radio Access Network; NR; User Equipment (UE) Procedures in Idle Mode and RRC Inactive State (Release 15), consisting of 21 pages.
3GPP TS 23.003 V15.3.0 (Mar. 2018) 3rd Generation Partnership Project; Technical Specification Group Core Network and Terminals; Numbering, Addressing and Identification (Release 15), consisting of 118 pages.
3GPP TS 36.331 V15.1.0 (Mar. 2018) 3rd Generation Partnership Project; Technical Specification Group Radio Access Network; Evolved Universal Terrestrial Radio Access (E-UTRA); Radio Resource Control (RRC); Protocol Specification (Release 15), consisting of 786 pages.
3GPP TS 38.331 V15.1.0 (Mar. 2018) 3rd Generation Partnership Project; Technical Specification Group Radio Access Network; NR; Radio Resource Control (RRC) Protocol Specification (Release 15), consisting of 268 pages.
3GPP TSG-RAN WG2 #Bis, Sanya, P.R. of China, Apr. 16-20, 2018; CR on Connection Control ([101#37] [NR] RRC Procedures/Messages), Based on Draft TS 38.331 V15.1.0, consisting of 306 pages.
Russian Office Action and English translation of the Russian Office Action dated May 26, 2021 issued in corresponding Russian Application No. 2020137132, consisting of 7 pages.
Korean Office Action and English translation of the Korean Office Action dated Oct. 5, 2021 issued in corresponding Korean Application No. 10-2020-7032973, consisting of 11 pages.
3GPP TSG-RAN WG2 #101Bis; Tdoc R2-180xxxx, Change Request; Title: CR on Connection Control ([101#37][NR] RRC Procedures/Messges), Sanya, P.R. of China, Apr. 16-20, 2018, consisting of 305 pages.
Japanese Office Action and English summary of the Japanese Office Action dated Dec. 13, 2021 issued in corresponding Japan Application No. 2020-555039, consisting of 4 pages.
R2-1805051; 3GPP TSG-RAN2 Meeting #101bis; Change Request 36.331 CR re-current version: 15.1.0; Title: Stage 3 RRC TP on RRCE-Inactive State for E-UTRA Connected to 5GC; Source: Intel; Work Item Code: LTE_5GCN_Connect Core, consisting of 6 pages.
R2-1815581 (Revision of R2-1814642); 3GPP TSG RAN WG2 #103bis; Title: Handling of Timer T380 (periodic RNAU timer); Agenda Item: 10.4.1.3.9 Inactive; Source: Ericsson; Document for: Discussion, Decision, Chengdu, China Oct. 8-12, 2018, consisting of 5 pages.
R2-1806717; Title: UE Actions Upon Receiving RRCReject; Source: CATT; Agenda Item: 10.4.3.6; Document for: Discussion and Decision, Busan, Korea, May 21-25, 2018, consisting of 3 pages.
Japanese Office Action and English summary of the Japanese Office Action dated Jul. 25, 2022 issued in corresponding Japan Application No. 2020-555039, consisting of 4 pages.
3GPP TSG RAN WG2 Meeting #100; R2-172674; Agenda Item: 10.4.1.7.6; Source: Intel Corporation; Title: TP on Agreed NR Inactive Aspects; Document for: Discussion and Decision; Reno, USA, Nov. 27-Dec. 1, 2017, consisting of 8 pages.
Chinese Office Action dated Aug. 30, 2023 and English language Summary translation of the Chinese Office Action issued in corresponding Chinese Application No. 201980026062.0, consisting of 13 pages.
SA WG2 Temporary Document; SA WG2 Meeting # 122bis S2-175933 (was S2-17xxxx); Source: Lenovo, Motorola Mobility; Title 23.501: Update to RRC Inactive State; Document for: Approval; Agenda Item: 6.5.7.5_inactive related; Work Item / Release: 5G_Ph1 / Rel 15; Aug. 21-25, 2017, Sophia Antipolis, France, consisting of 4 pages.
3GPP TSG RAN WG1 Meeting #92bis; R1-180505; Sanya, China, Apr. 16-Apr. 20, 2018; Source: NTT DoCoMo, Inc.; Title: PUCCH structure in short-duration; Agenda Item: 7.1.3.2.1; Document for: Discussion and Decision, consisting of 3 pages.
Chinese Office Action and English language summary of the Chinese Office Action dated Jan. 20, 2024 issued in corresponding Chinese Application No. 201980026062.0, consisting of 12 pages.
SA WG2 Temporary Document; SA WG2 Meeting #123; S2-177509; Source: Nokia, nokia Shanghai Bell; Title: 23.501 §5.3.3.2.5: RAN processing of RRC resume failure; Document for: Approval; Agenda Item: 6.5.7.5; Work Item / Release: 5G_ph1/ Rel-15; Oct. 23-27, 2017, Ljubljana, SL, consisting of 3 pages.
3GPP TSG-RAN WG2 NR Ad hoc 1801, R2-1800913, Vancouver, Canada, Jan. 22-26, 2018, Agenda Item: 10.4.1.7.6, Source: Intel Corporation, Title: TP on agreed NR Inactive aspects, Document for: Discussion and Decision, consisting of 12 pages.
3GPP TSG-RAN WG2 #101bis, R2-1805352 (Revision of R2-1802361), Sanya, P.R. of China, Apr. 16-20, 2018, Agenda Item: 10.4.1.3.2, Source: Ericsson, Title: Summary of agreements on connection control, Document for: Discussion, consisting of 18 pages.
Japanese Office Action dated May 13, 2024 and English Summary translation of the Japanese Office Action issued in corresponding Japanese Patent Application No. 2023-026363, consisting of 5 pages.

* cited by examiner

HANDLING OF PERIODIC RADIO ACCESS NETWORK (RAN) BASED NOTIFICATION AREA (RNA) TIMER

CROSS-REFERENCE TO RELATED APPLICATIONS

This application is a continuation of U.S. application Ser. No. 17/043,980, filed Sep. 30, 2020, entitled "HANDLING OF PERIODIC RADIO ACCESS NETWORK (RAN) BASED NOTIFICATION AREA (RNA) TIMER", which claims priority to International Application No. PCT/IB2019/053150, filed Apr. 16, 2019, entitled "HANDLING OF PERIODIC RADIO ACCESS NETWORK (RAN) BASED NOTIFICATION AREA (RNA) TIMER", which claims priority to U.S. Provisional Application No. 62/657,975, filed Apr. 16, 2018, entitled "HANDLING OF PERIODIC RNA UPDATE TIMER", the entireties of all of which are incorporated herein by reference.

TECHNICAL FIELD

The present disclosure relates to wireless communications, and in particular, to handling a periodic Radio Access Network (RAN) based Notification Area (RNA) update timer.

BACKGROUND

RRC Connection Resume in LTE

In Long Term Evolution (LTE) $3^{rd}$ Generation Partnership Project (3GPP) Release (Rel)-13, a mechanism was introduced for a wireless device (WD) to be placed by the network in a suspended state similar to an RRC_IDLE state but with the difference that the WD stores the Access Stratum (AS) context or radio resource control (RRC) context. This makes it possible to reduce the signalling when the WD becomes active again by resuming the RRC connection, instead of establishing the RRC connection from scratch. Reducing the signalling can have several benefits:

Reduced latency, e.g., for smart phones accessing Internet;

Reduced signalling leads to reduced battery consumption for machine type devices sending very little data.

The Rel-13 solution is based on the WD sending a RRCConnectionResumeRequest message to the network and in response receiving an RRCConnectionResume from the network. The RRCConnectionResume is not encrypted but is integrity protected.

RRC_INACTIVE in NR and Possibly in LTE Rel-15

As part of the standardized work on Fifth Generation New Radio (5G NR) in the Third Generation Partnership Product (3GPP) series of standards, it has been decided that NR should support an RRC_INACTIVE state with similar properties as the suspended state in LTE Rel-13. The RRC_INACTIVE state has slightly different properties from the later state in that it is a separate RRC state and not part of the RRC_IDLE state as in LTE. Additionally, the core network/radio access network (CN/RAN) connection (NG or N2 interface) is kept for the RRC_INACTIVE state while it was suspended in LTE. FIG. 1 shows possible state transitions between these states in NR.

The properties of the states above are as follows:

RRC_IDLE:

A WD 1 specific discontinuous reception (DRX) mode may be configured by upper layers;

the WD 1 controlled mobility is based on network configuration; and

The WD 1:
  a) Monitors a Paging channel for CN paging using 5G-S-temporary mobile subscriber identity (TMSI);
  b) Performs neighboring cell measurements and cell (re-)selection; and
  c) Acquires system information.

RRC_INACTIVE:

A WD 1 specific DRX may be configured by upper layers or by radio resource control (RRC) layer;

WD 1 controlled mobility is based on network configuration;

The WD 1 stores the access stratum (AS) context; and

The WD 1:
  a) Monitors a Paging channel for CN paging using 5G-S-TMSI and RAN paging using I-radio network temporary identifier (RNTI);
  b) Performs neighboring cell measurements and cell (re-)selection;
  c) Performs RAN-based notification area updates periodically and when moving outside the RAN-based notification area; and
  d) Acquires system information.

RRC_CONNECTED:

The WD 1 stores the AS context.

Transfer of unicast data to/from the WD 1.

At lower layers, the WD may be configured with a WD 1 specific DRX;

For WDs 1 supporting carrier aggregation (CA), use of one or more secondary cells (SCells), aggregated with the secondary primary cell (SpCell), for increased bandwidth;

For WDs 1 supporting DC subcarrier, use of one secondary cell group (SCG), aggregated with the master cell group (MCG), for increased bandwidth;

Network controlled mobility, i.e., handover within NR and to/from evolved universal terrestrial radio access network (E-UTRAN); and The WD 1:
  a) Monitors a Paging channel;
  b) Monitors control channels associated with the shared data channel to determine if data is scheduled for it;
  c) Provides channel quality and feedback information;
  d) Performs neighboring cell measurements and measurement reporting; and
  e) Acquires system information.

Configuration of Periodic RNA Update Timer

It has been agreed in NR that the transition from the RRC_CONNECTED state to the RRC_INACTIVE state is done in one step, and may contain a timer for periodic RNAs, as shown below:

RAN2-98— May 2017

The RRC state transition from the CONNECTED state to the INACTIVE state follows a one-step procedure.

RAN2-99— August 2017

For the CONNECTED state to INACTIVE RRC state transition, a RRC Connection Release type of message is used and is sent over signalling radio bearer 1 (SRB1).

For the CONNECTED state to INACTIVE RRC state transition, the RRC Connection Release type of message includes (a) cause information, redirect carrier frequency and mobility control information, and can include (b) WD 1 identity (or WD 1 context identity), and optionally (c) a suspension/inactivation indication (either implicitly or explicitly), (d) radio access network (RAN) configured DRX cycle, (e) RAN periodic notification timer, and (f) RAN notification area. A corresponding diagram of transition from the RRC_Connected state to the RRC_Inactive state is shown in FIG. 2.

There is an ongoing discussion whether the transition should be performed using an RRC Release message with a suspend indication or a separate message called RRC Suspend, but regardless of the final decision, that message may contain the Periodic RNA Update timer.

It is assumed that the WD 1 shall start the timer upon receiving the RRC Suspend (or equivalent) message. It is also assumed that the WD 1 shall trigger a periodic RNA update upon the expiry of that timer, called T380.

In the current Connection Control (CR), a procedure for starting the timer may be implemented as follows (for example, using the RRC Suspend message):

Reception of the RRCSuspend by the WD 1
According to one possible procedure, the WD 1 may:
delay the following actions defined in this sub-clause for X ms from the moment the RRCSuspend message was received or optionally when lower layers indicate that the receipt of the RRCSuspend message has been successfully acknowledged, whichever is earlier (where X is to be configurable or may be fixed at 60 as in LTE);
If the RRCSuspend message includes the idleModeMobilityControlInfo:
  a) store the cell reselection priority information provided by the idleModeMobilityControlInfo;
  b) if the T320 (i.e., a timer) is included:
    i) start timer T320, with the timer value set according to the value of T320;
else:
  a) apply the cell reselection priority information broadcast in the system information;
store the following information provided by the network: resumeIdentity, nextHopChainingCount, ranPagingCycle and ran-NotificationAreaInfo;
re-establish radio link control (RLC) entities for all SRBs and DRBs;
reset MAC;
unless the RRCSuspend message was received in response to an RRCResumeRequest:
  a) store the WD AS Context including the current RRC configuration, the current security context, the PDCP state including robust header compression (ROHC) state, C-RNTI used in the source primary cell (PCell), the cellIdentity and the physical cell identity of the source PCell;
suspend all SRB(s) and DRB(s), except SRB0;
start timer T380, with the timer value set to periodic-RNAU-timer;
indicate the suspension of the RRC connection to upper layers;
configure lower layers to suspend integrity protection and ciphering;
enter RRC_INACTIVE and perform procedures as specified in TS 38.304 T380 expiry or WD 1 entering a cell not belonging to the RNA According to another possible procedure, the WD shall:
if T380 expires:
  a) initiate RRC connection resume procedure discussed above with cause value set to 'ffs',
If WD 1 is entering a cell not belonging to the RNA:
  a) initiate RRC connection resume procedure discussed above with cause value set to 'ffs';
Another action related to this timer T380 is the stop criteria, which relates to the disclosures herein. In the current Connection Control, the WD 1 stops timer T380 when it expires. Hence, when the T380 expires, the WD 1 stops the timer T380 and initiates a Resume procedure by sending a Resume Request message with cause value related to RNA (e.g. 'rna-update' or 'periodic-rna-update').

In addition to that case, the specifications also describe that the WD 1 stops the T380 timer upon the reception of an RRC Resume message. That is because at this point the network already has knowledge about the WD 1 location, and hence, there is need to receive an RNA update.

FIGS. 3-7 illustrate procedures for RRC connection resume processes in various circumstances between WD 1 and network node 2. FIG. 3 shows when the RRC connection resume process is successful. FIG. 4 shows when the RRC connection resume fallback to RRC connection establishment process is successful. FIG. 5 shows when the RRC connection resume followed by network release process is successful. FIG. 6 shows when the RRC connection resume followed by network suspend process is successful. FIG. 7 shows the RRC connection resume resulting in network rejection.

A purpose of the RRC connection resume procedure is to resume an RRC connection including resuming signalling radio bearers (SRBs) and dedicated radio bearers (DRBs) or performing an RNA update.

Initiation

The WD 1 initiates the procedure when upper layers request resumption of an RRC connection, when responding to NG-RAN paging or upon triggering RNA updates while the WD 1 is in RRC_INACTIVE.

According to one possible procedure, upon initiation of the RRC connection resume procedure, the WD 1 may (references in this paragraph to sections, e.g., 9.2.4, refer to sections in 3GPP TS 38.331 v 15.1.0:
apply the default physical channel configuration as specified in 9.2.4;
apply the default semi-persistent scheduling configuration as specified in 9.2.3;
apply the default MAC main configuration as specified in 9.2.2;
apply the common control channel (CCCH) configuration as specified in 9.1.1.2;
start timer T300X;
stop timer T380;
initiate transmission of the RRCResumeRequest message in accordance with 5.3.13.2 of, for example, 3GPP TS 38.331 v15.1.0.

TABLE 1 Timers

| T 380 | Reception of RRCSuspend. | Upon initiation of RRC resume procedure. | Perform the actions as specified in 5.3.13 of, for example, 3GPP TS 38.331 v15.1.0. |
|---|---|---|---|

A first problem with the procedures described above is that the WD 1 in NR may receive an RRC Setup message in response to an RRC Resume Request message, ordering the WD 1 to enter RRC Connection. Although that procedure also exists in LTE, timer T380 does not exist in LTE. Hence, in that case, there is no action specified for the timer T380 for NR which would lead to the WD entering the RRC_CONNECTED state while possibly having the timer T380 still running. That could possibly lead the timer T380 to expire while the WD 1 is in the RRC_CONNECTED state, which is not desired as the network already knows the WD 1 location in the RRC_CONNECTED state. This could lead to unnecessary signal or error cases.

A second problem relates to the handling of the T380 timer when an RRC_INACTIVE WD sends an RRC Resume Request message due to reasons other than a periodic RNA update (so timer T380 would still be running while the WD 1 sends an RRC Resume Request message). An example is a mobility trigger RNA (the WD 1 enters a cell that does not belong to its configured RNA) or uplink (UL) early data transmission, where the WD 1 may already transmit small UL data multiplexed with the RRC Resume Request message. In response to these two cases, the network may respond with an RRC Suspend message (or any other equivalent message moving the WD 1 back to the RRC_INACTIVE state). A problem is that the WD 1 behavior related to T380 in that case (response with Suspend message) is not clearly defined in the specification, as the timer would still be running when the WD possibly receives a new timer value.

A third problem relates to the handling of the T380 timer when an RRC_INACTIVE WD sends an RRC Resume Request message due to reasons other than a periodic RNA update, e.g., a mobility trigger RNA (the WD 1 enters a cell that does not belong to its configured RNA). Another possible case is UL early data transmission, where the WD 1 may transmit small UL data already multiplexed with the RRC Resume Request message. In response to these two cases, the network may respond with an RRC Release message (or any other equivalent message moving the WD back to the RRC_IDLE state) and, in that case, the timer T380 would still be running while the WD sends an RRC Resume Request message. The WD 1 behavior related to T380 in that case is not clearly defined in the specification as the timer would still be running when the WD 1 possibly receives a new timer value.

A fourth problem relates to the handling of the T380 timer when an RRC_INACTIVE WD fails to perform an RRC resume procedure (i.e., it does not enter the RRC_CONNECTED state, and hence, does not stop the timer T380). That could occur due to some failure cases, e.g., coverage problems upon sending an RRC Resume Request message. Upon sending the request, a timer T300X starts and, if the WD 1 does not receive a response while the timer T300X is running, the WD 1 enters the RRC_IDLE state and notifies the higher layer. As T380 would be running in the RRC_INACTIVE state, according to current procedures it would continue to run after the WD 1 enters the RRC_IDLE state. This is an undesirable behavior as the timer is useful as a keep-alive mechanism to notify the RAN periodically that the WD 1 is still reachable, whereas in the RRC_IDLE state, the CN is responsible for the WD 1 reachability. FIG. 8 illustrates a resume procedure failure due to bad downlink (DL) radio conditions. FIG. 9 illustrates a resume procedure failure due to bad uplink (UL) radio conditions.

A fifth problem relates to the handling of the T380 timer when an RRC_INACTIVE WD 1 enters the RRC_IDLE state without necessarily going through the RRC_CONNECTED state, e.g., based on any INACTIVE to IDLE mechanism, such as a configured timer that upon expiry makes the WD 1 release its AS context and transit from the RRC_INACTIVE state to the RRC_IDLE state. As T380 would be running in the RRC_INACTIVE state, according to current procedures it would continue to run after the WD 1 enters the RRC_IDLE state. This is an undesirable behavior as the timer is useful as a keep-alive mechanism to notify the RAN periodically that the WD 1 is still reachable, whereas in the RRC_IDLE state, the CN is responsible for the WD 1 reachability. Hence, there is no need to keep T380 running.

A sixth problem relates to the handling of the T380 timer when an RRC_INACTIVE WD 1 enters the RRC_IDLE state without necessarily going through the RRC_CONNECTED state upon CN paging while the WD 1 is in the RRC_INACTIVE state, which may be triggered by the network/network node 2, e.g., when the network has lost the WD 1 context and needs to notify the WD 1. As T380 would be running in the RRC_INACTIVE state, according to current procedures it would continue to run after WD 1 enters the RRC_IDLE state. This is an undesirable behavior as the timer is useful as a keep-alive mechanism to notify the RAN periodically that the WD 1 is still reachable, whereas in the RRC_IDLE state, the CN is responsible for the WD 1 reachability. Hence, there is no need to keep T380 running.

A seventh problem, mainly related to the reception of an RRC Suspend message (or equivalent message indicating that the WD 1 should stay in the RRC_INACTIVE state), is the lack of clarity about the WD 1 actions upon receiving a Suspend message that may or may not contain a value for the periodic RNA update T380 timer, while an existing instance of the periodic RNA update timer T380 is running.

SUMMARY

Some embodiments advantageously provide methods and wireless devices for handling a periodic RNA update timer. Some embodiments introduce new mechanisms to handle the periodic RNA update timer upon procedures that can occur when the WD is in the RRC_INACTIVE state. Herein are described different scenarios where the WD stops the RNA update timer if running to avoid unnecessary signalling or strange behavior in a state where the WD should not perform RNA updates. For example, a method is described where the WD stops the periodic RNA update timer upon receiving an RRC Suspend message (or equivalent, such as an RRC Release message with suspend indication, herein referred to as an RRC Suspend message), or upon receiving an RRC Release message (or equivalent message ordering the WD to the RRC_IDLE state), or upon any other triggering moving the WD to the RRC_IDLE state.

Some embodiments also address handling the reception of new periodic RNA timer values (i.e., T380 timer values) when the WD receives a Suspend message with a new T380 timer value. As used herein, the terms periodic RNA timer, T380 and T380 timer are used interchangeably.

By using mechanisms described herein, there is a clear WD behavior defined for subsequent Suspend procedures or when the WD enters the RRC_IDLE state from the RRC_INACTIVE state without entering the RRC_CONNECTED state.

Being more specific, applying the mechanisms described herein avoids the WD keeping the periodic RNA timer (T380) running while entering the RRC_IDLE state or upon receiving an RRC Suspend message which may or may not contain new values of the T380 timer.

According to one aspect of the disclosure, a wireless device configured to communicate with a network node is provided. The wireless device includes processing circuitry configured to start a periodic Radio Access Network (RAN)

based Notification Area (RNA) update timer based at least in part on the wireless device being in a Radio Resource Control (RRC) inactive state where the periodic RNA update timer is configured to initiate an RRC resume procedure when the periodic RNA update timer expires. The processing circuitry is configured to, if the periodic RNA update timer is running, stop the periodic RNA update timer before expiry of the periodic RNA update timer based at least in part on a condition being met where the condition is based at least in part on RRC signaling.

According to one or more embodiments of this aspect, the condition being met corresponds to the wireless device receiving, in response to an RRC Resume Request message, an RRC Setup message for triggering transition of the wireless device to an RRC connected state. According to one or more embodiments of this aspect, the condition being met corresponds to the wireless device receiving, in response to an RRC Resume Request message, an RRC suspend message indicating that the wireless device is to remain in an RRC inactive state. According to one or more embodiments of this aspect, the processing circuitry is further configured to, if the received RRC suspend message includes a configuration associated with the periodic RNA update timer, restart the periodic RNA update timer according at least to the configuration in the received RRC suspending message.

According to one or more embodiments of this aspect, the processing circuitry is further configured to, if the received RRC suspend message fails to include a configuration associated with the periodic RNA update timer, restart the periodic RNA update timer according to a previous configuration. According to one or more embodiments of this aspect, the condition being met corresponds to the wireless device receiving, in response to an RRC Resume Request message, an RRC Release message triggering transition of the wireless device to an RRC idle state. According to one or more embodiments of this aspect, the condition being met corresponds to the wireless device failing to receive, after sending an RRC Resume Request message, one of an RRC Resume message, RRC Suspend message or an RRC Release message.

According to one or more embodiments of this aspect, the condition being met corresponds to the wireless device entering an RRC idle state from an RRC inactive state without transitioning through an RRC connected state. According to one or more embodiments of this aspect, the start of the periodic RNA update timer is triggered upon entering the RRC inactive state.

According to another aspect of the disclosure, a method implemented in a wireless device configured to communicate with a network node is provided. A periodic Radio Access Network (RAN) based Notification Area (RNA) update timer is started based at least in part on the wireless device being in a Radio Resource Control (RRC) inactive state where the periodic RNA update timer is configured to initiate an RRC resume procedure when the periodic RNA update timer expires. If the periodic RNA update timer is running, the periodic RNA update timer is stopped before expiry of the periodic RNA update timer based at least in part on a condition being met where the condition is based at least in part on RRC signaling.

According to one or more embodiments of this aspect, the condition being met corresponds to the wireless device receiving, in response to an RRC Resume Request message, an RRC Setup message for triggering transition of the wireless device to an RRC connected state. According to one or more embodiments of this aspect, the condition being met corresponds to the wireless device receiving, in response to an RRC Resume Request message, an RRC suspend message indicating that the wireless device is to remain in an RRC inactive state. According one or more embodiments of this aspect, if the received RRC suspend message includes a configuration associated with the periodic RNA update timer, the periodic RNA update timer is restarted according at least to the configuration in the received RRC suspending message.

According one or more embodiments of this aspect, if the received RRC suspend message fails to include a configuration associated with the periodic RNA update timer, the periodic RNA update timer is restarted according to a previous configuration. According one or more embodiments of this aspect, the condition being met corresponds to the wireless device receiving, in response to an RRC Resume Request message, an RRC Release message triggering transition of the wireless device to an RRC idle state. According one or more embodiments of this aspect, the condition being met corresponds to the wireless device failing to receive, after sending an RRC Resume Request message, one of an RRC Resume message, RRC Suspend message or an RRC Release message.

According one or more embodiments of this aspect, the condition being met corresponds to the wireless device entering an RRC idle state from an RRC inactive state without transitioning through an RRC connected state. According one or more embodiments of this aspect, the start of the periodic RNA update timer is triggered upon entering the RRC inactive state.

According to another aspect of the disclosure, a wireless device configured to communicate with a network node is provided. The wireless device includes processing circuitry configured to start a periodic Radio Access Network (RAN) based Notification Area (RNA) update timer based at least in part on the wireless device being in a Radio Resource Control (RRC) inactive state where the periodic RNA update timer is configured to initiate an RRC resume procedure when the periodic RNA update timer expires. The processing circuitry is further configured to receive a RRC message, and if the periodic RNA update timer is running, stop the periodic RNA update timer before expiry of the periodic RNA update timer based at least in part the received RRC message.

According one or more embodiments of this aspect, the RRC message is one of a RRC setup message, RRC resume request message, RRC suspend message and RRC release message.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
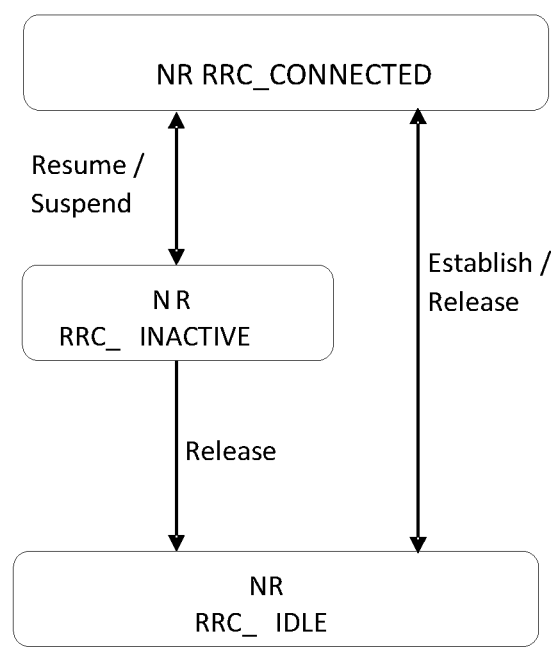
FIG. 1 is a state diagram showing possible state transitions in NR.
Figure 2:
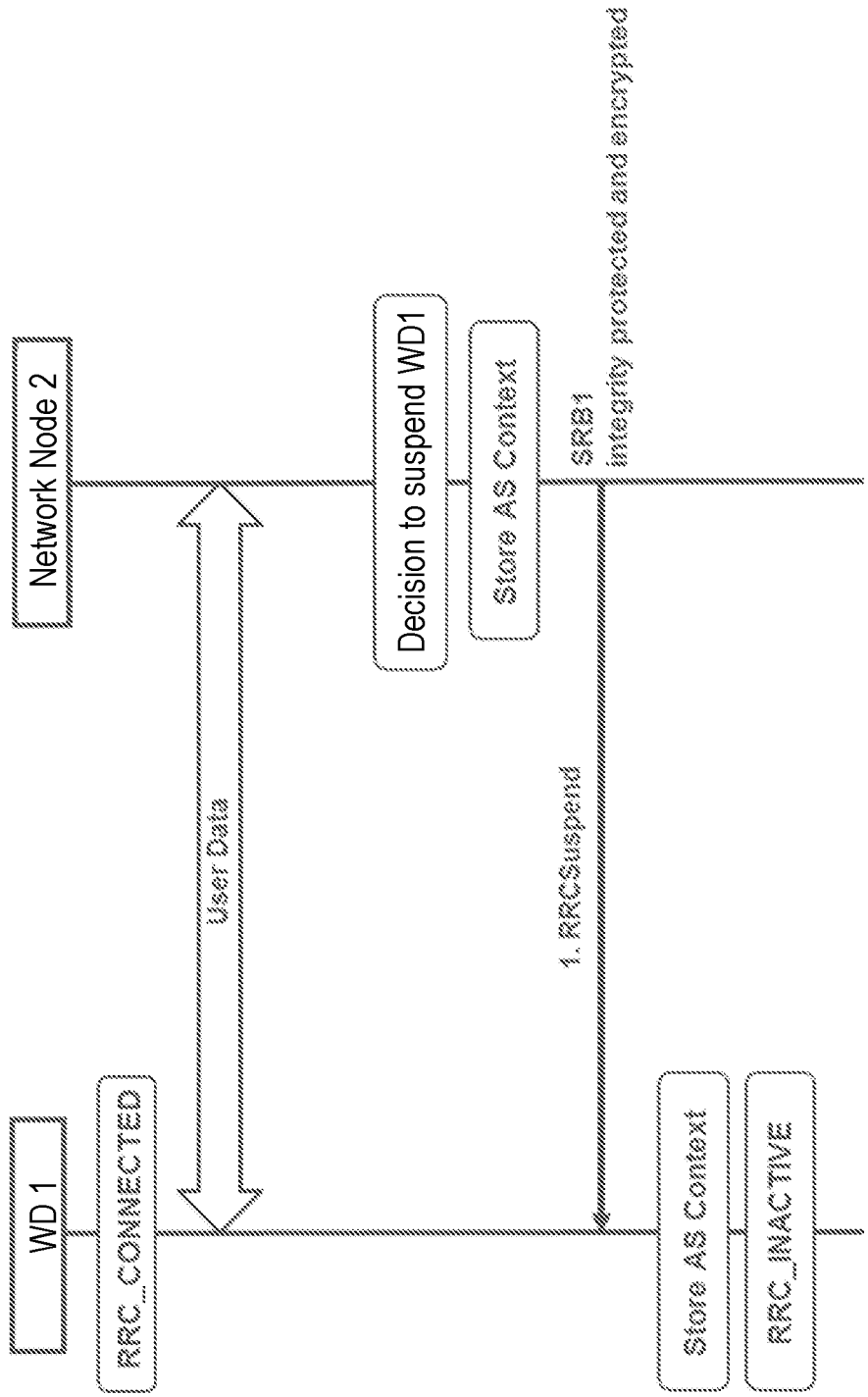
FIG. 2 is a diagram of transition from the RRC_Connected state to the RRC_Inactive state.
Figure 3:
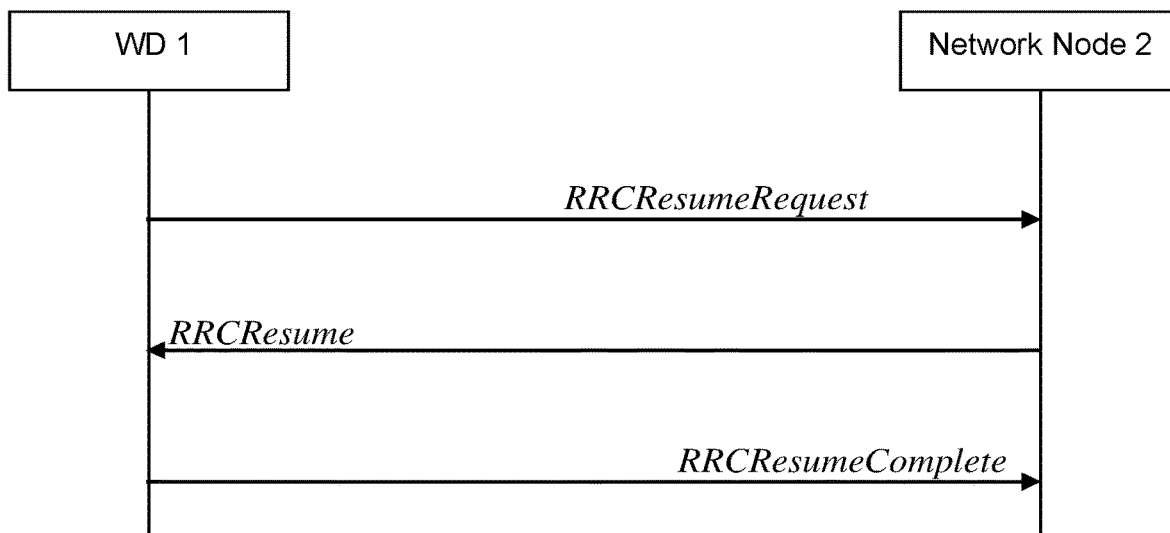
FIG. 3 is a diagram showing when the RRC connection resume process is successful.
Figure 4:
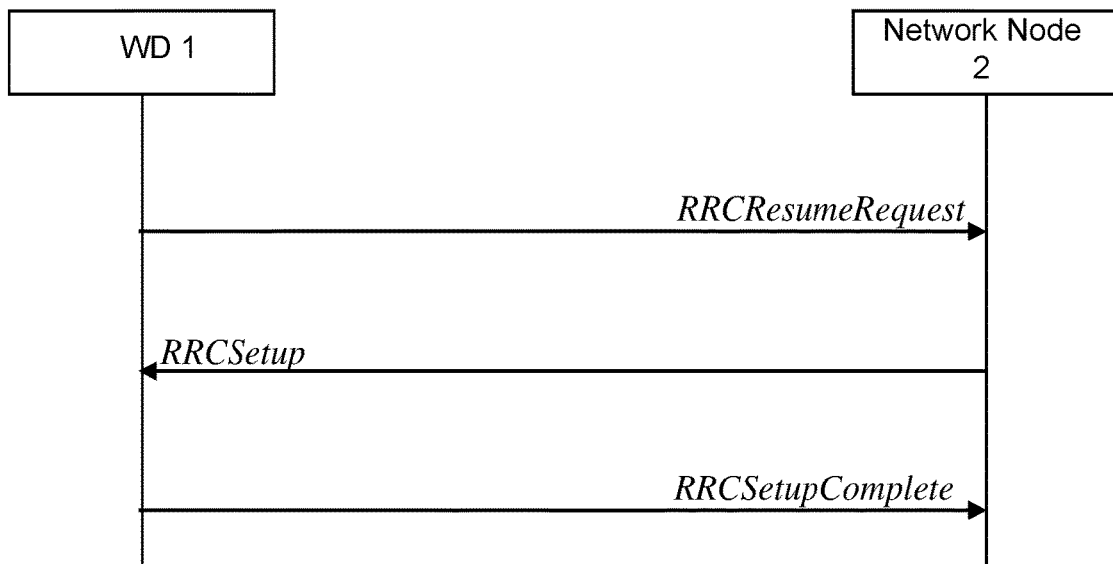
FIG. 4 is a diagram showing when the RRC connection resume fallback to RRC connection establishment process is successful.
Figure 5:
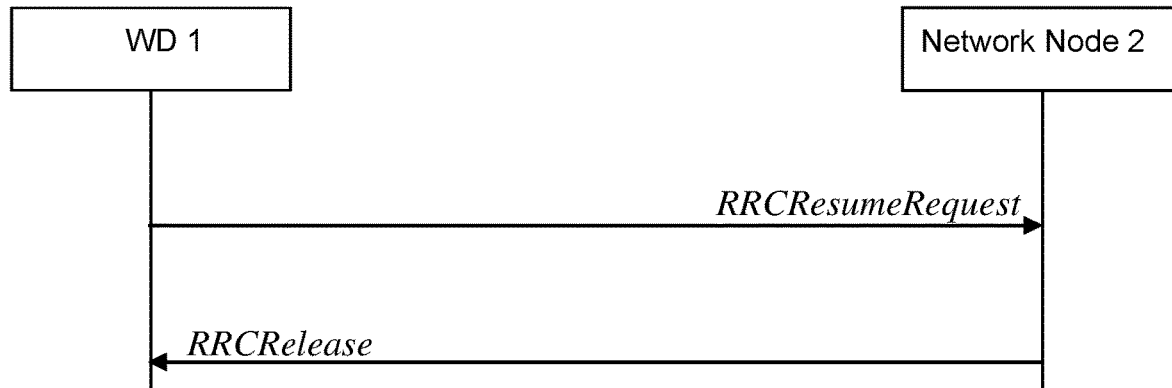
FIG. 5 is a diagram showing when the RRC connection resume followed by network release process is successful.
Figure 6:
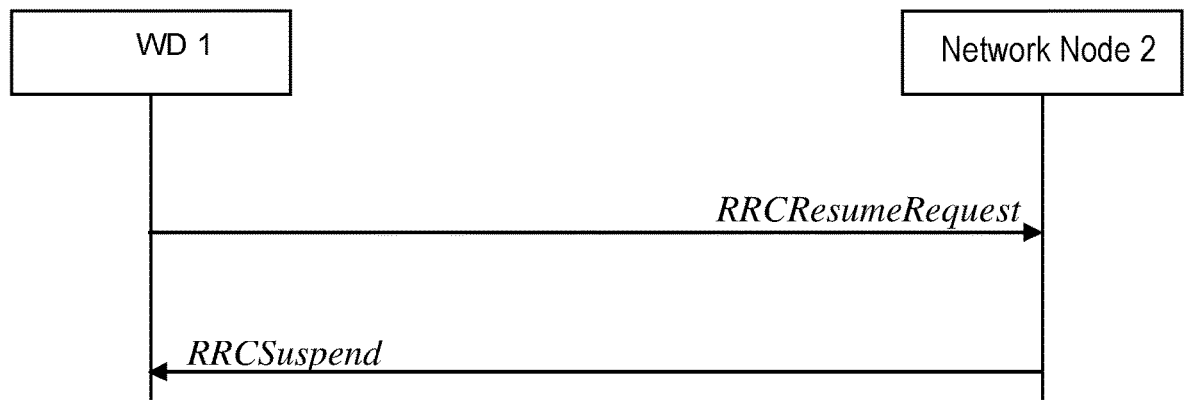
FIG. 6 is a diagram showing when the RRC connection resume followed by network suspend process is successful.
Figure 7:
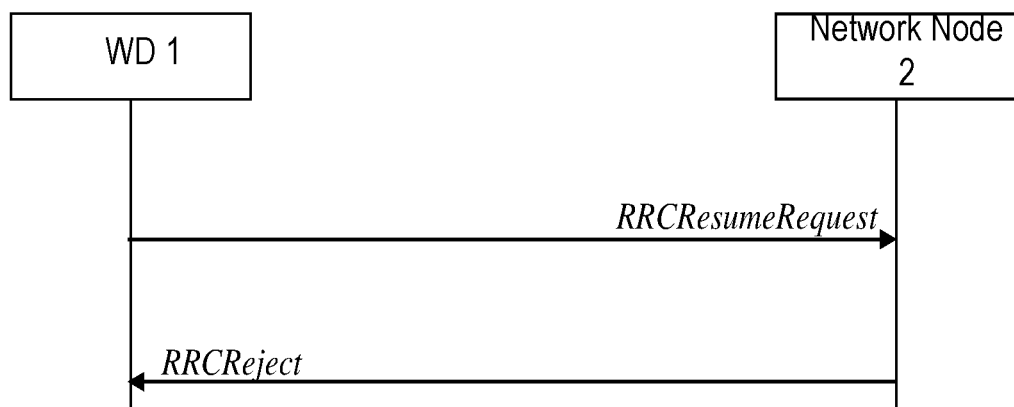
FIG. 7 is a diagram showing when the RRC connection resume resulting in network rejection.
Figure 8:
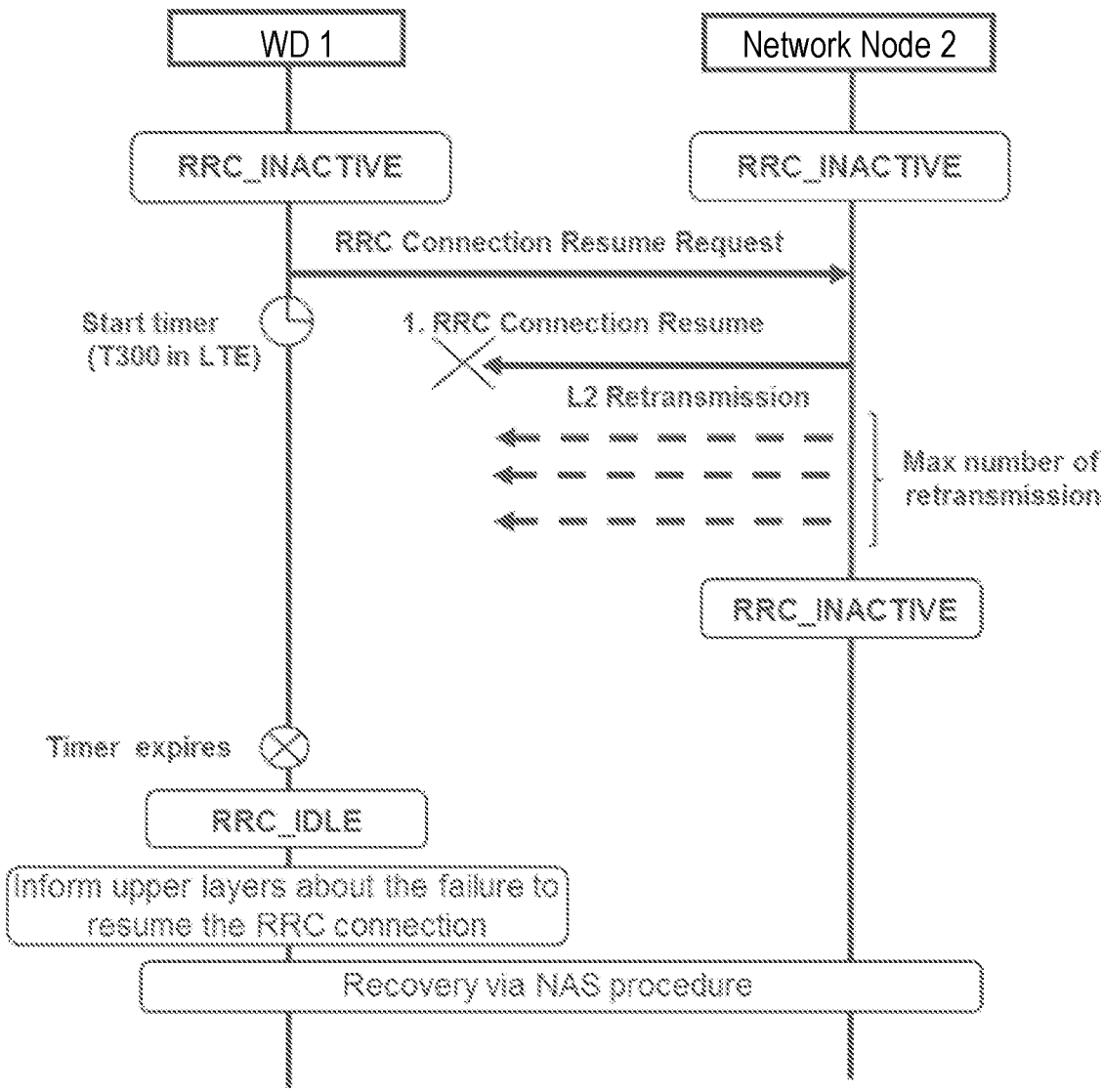
FIG. 8 illustrates a resume procedure failure due to bad downlink (DL) radio conditions.
Figure 9:
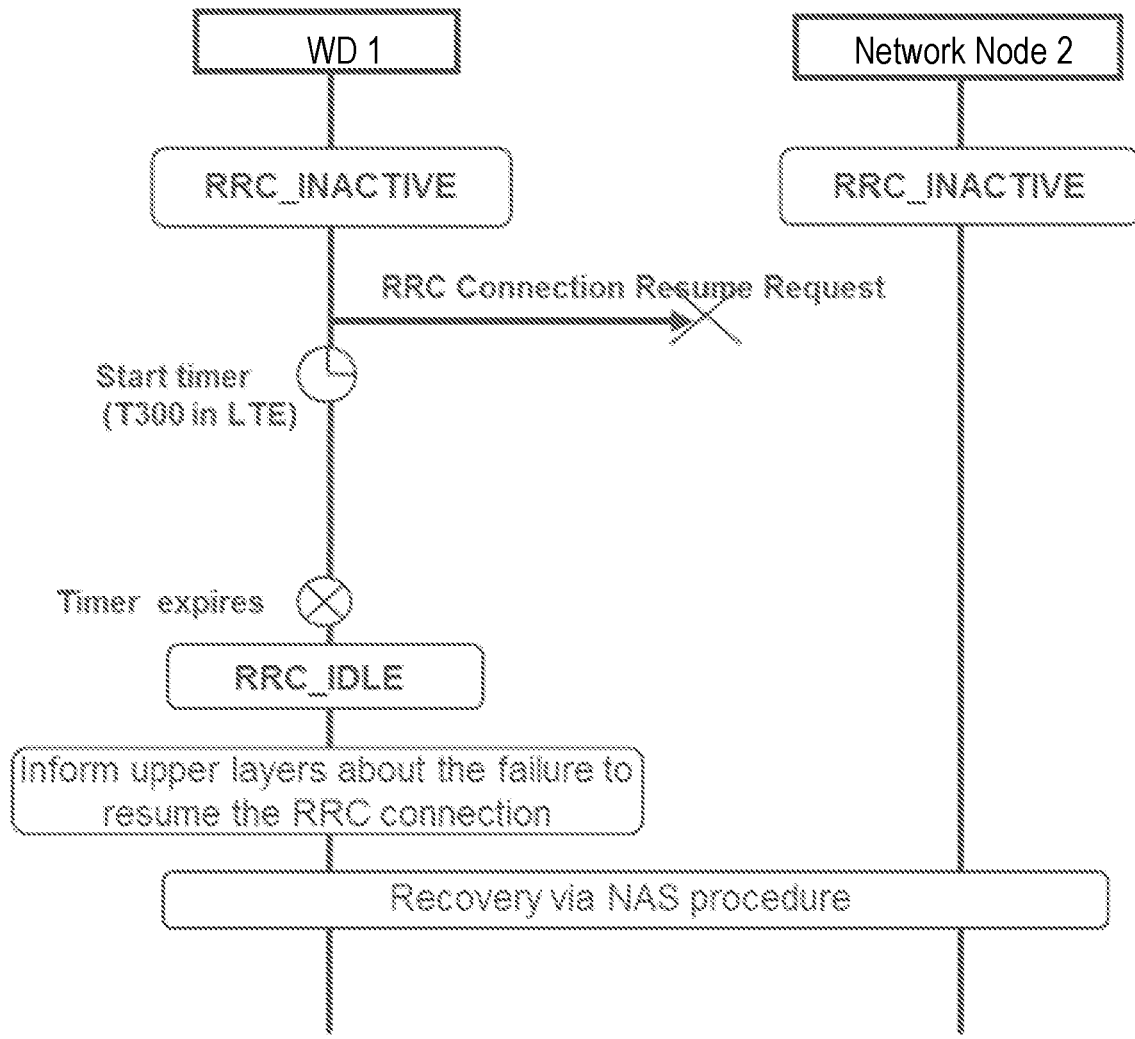
FIG. 9 illustrates a resume procedure failure due to bad uplink (UL) radio conditions.

Before describing in detail exemplary embodiments, it is noted that the embodiments reside primarily in combinations of apparatus components and processing steps related to handling a periodic RNA update timer. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signalling, infrared signalling or optical signalling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signalling as described herein, based on the utilized resource sequence, implicitly indicates the control signalling type.

The term signal used herein can be any physical signal or physical channel. Examples of physical signals are reference signal such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, sPDSCH, sPUCCH, sPUSCH, MPDCCH, NPDCCH, NPDSCH, E-PDCCH, PUSCH, PUCCH, NPUSCH etc. These terms/abbreviations may be used according to 3GPP standard language, in particular according to LTE and/or New Radio (NR).

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device 22). Alternatively, or additionally, configuring a radio node, e.g., by a network node 16 or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD 22) may comprise scheduling downlink and/or uplink transmissions for the terminal, e.g. downlink data and/or downlink control signalling and/or DCI and/or uplink control or data or communication signalling, in particular acknowledgement signalling, and/or configuring resources and/or a resource pool therefor. In particular, configuring a terminal (e.g. WD 22) may comprise configuring the WD 22 to perform certain measurements on certain subframes or radio resources and reporting such measurements according to embodiments of the present disclosure.

Signalling may comprise one or more signals and/or symbols. Reference signalling may comprise one or more reference signals and/or symbols. Data signalling may pertain to signals and/or symbols containing data, in particular user data and/or payload data and/or data from a communication layer above the radio and/or physical layer/s. It may be considered that demodulation reference signalling comprises one or more demodulation signals and/or symbols. Demodulation reference signalling may in particular comprise DM-RS according to 3GPP and/or LTE technologies. Demodulation reference signalling may generally be considered to represent signalling providing reference for a receiving device like a terminal to decode and/or demodulate associated data signalling or data. Demodulation reference signalling may be associated to data or data signalling, in particular to specific data or data signalling. It may be considered that data signalling and demodulation reference signalling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signalling may comprise and/or represent a sequence of signals and/or symbols, which may identify and/or define the demodulation reference signalling.

Data or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), backhaul (IAB) node, Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for handling a periodic RNA update timer. As used herein, the terms periodic RNA timer, T380 and T380 timer are used interchangeably. In some embodiments, methods are described as actions performed by an RRC_INACTIVE WD in NR. While some embodiments are applicable for that case, there can be other additional cases for which embodiments are applicable such as:

All previous cases where procedures occur in LTE instead of NR; that is for the case of LTE RRC_INACTIVE WDs;

Inter-radio access technology (RAT) procedures in the RRC_INACTIVE state, mainly between LTE and NR connected to the same CN (5G Core Network):

the WD in LTE RRC_CONNECTED state is suspended to LTE RRC_INACTIVE state and starts T380, performs mobility and camps on an NR cell (i.e., becomes in NR RRC_INACTIVE state) and tries to resume in NR while T380 is running.

the WD in NR RRC_CONNECTED state is suspended to NR RRC_INACTIVE state and starts T380, performs mobility and camps on an LTE cell (i.e., transits to LTE RRC_INACTIVE state) and tries to resume in LTE while T380 is running.

Note that in the description for the inter-RAT case, a common T380 timer for the RRC_INACTIVE state mobility is defined.

Figure 10:
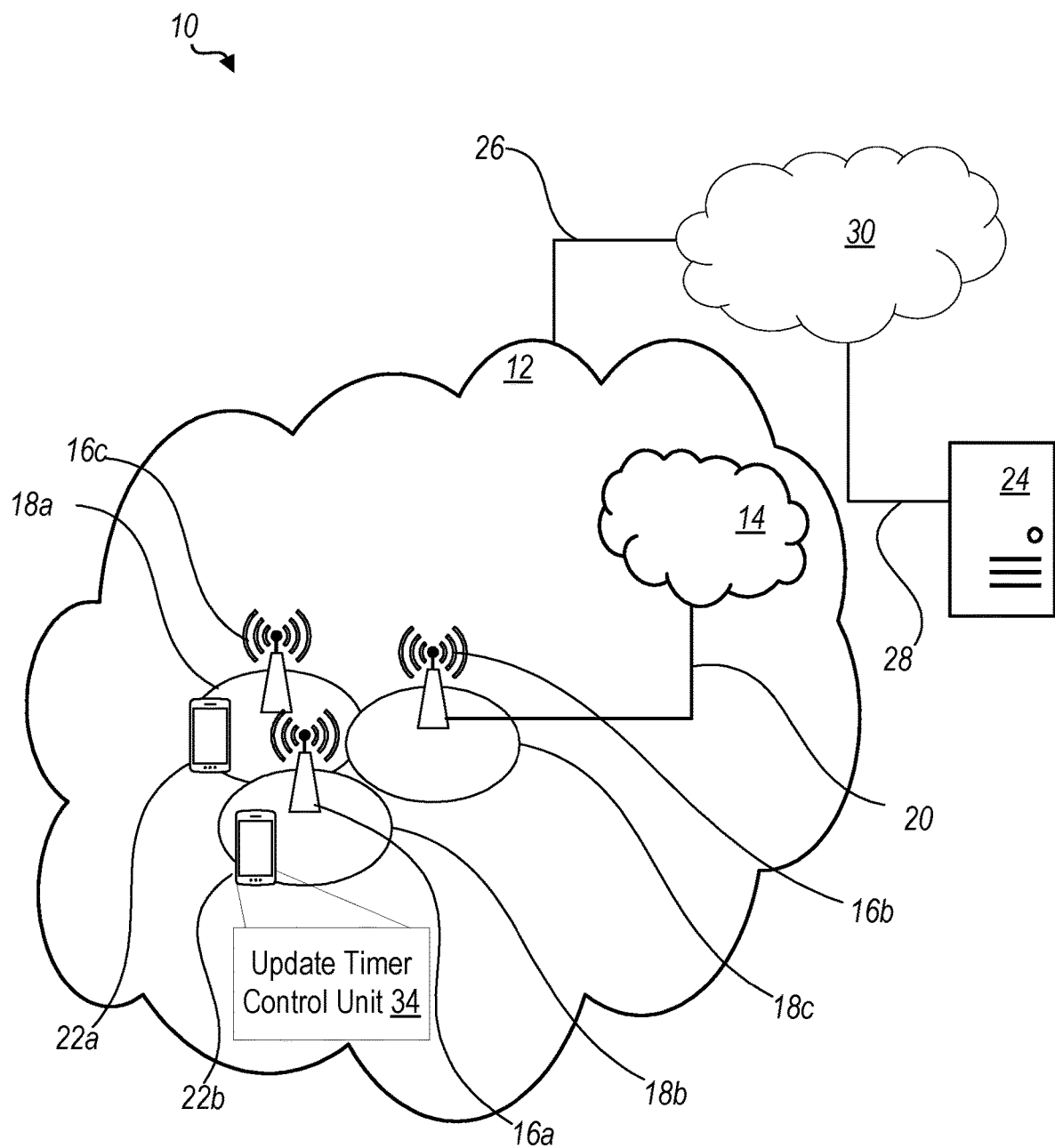
FIG. 10 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 10 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 10 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signalling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to communicate and exchange messages and data with a wireless device 22. The wireless device 22 is configured to include an update timer control unit 34 which is configured to stop an update timer when one of a set of conditions exists as explained below. The wireless device 22 also is configured to determine and cause transition to various states of the WD such as via update timer control unit 34 and/or processing circuitry 84.

Example implementations, in accordance with an embodiment, of the WD 22, network node 16 and host computer 24 discussed in the preceding paragraphs will now be described with reference to FIG. 11. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an update timer control unit 34 which is configured to stop an update timer when one of a set of conditions exists as explained below. The WD 22, via processor 84 and/or processing circuitry 84, may be further configured to determine the states and direct the transitions between states of the WD 22. The radio interface 82 of the WD 22 functions to receive RRC Setup messages, RRC Suspend messages and RRC Release messages in response to RRC Resume request messages.

Figure 11:
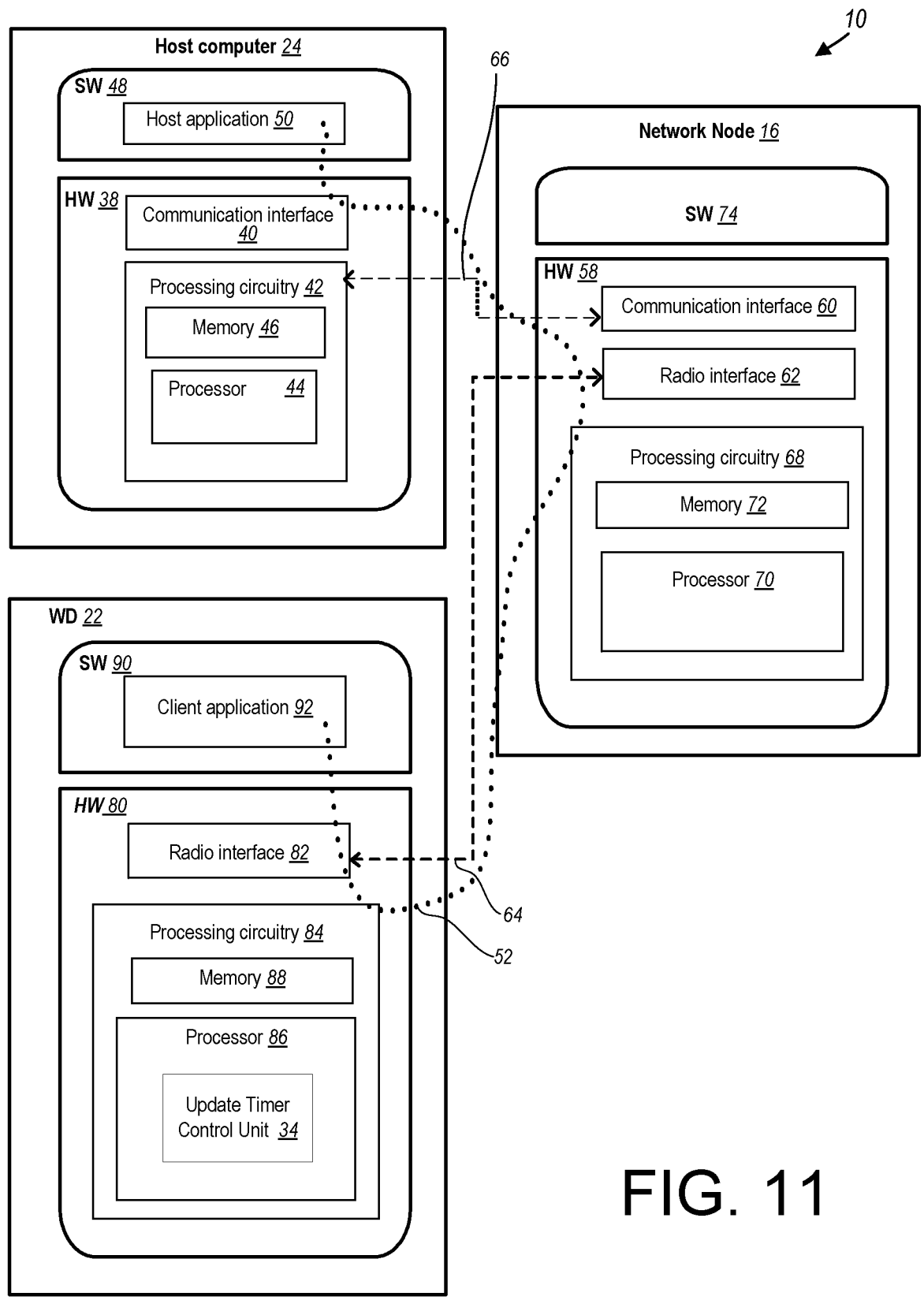
FIG. 11 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 11 and independently, the surrounding network topology may be that of FIG. 10.

In FIG. 11, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and the WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signalling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 10 and 11 show various "units" such as update timer control unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 12:
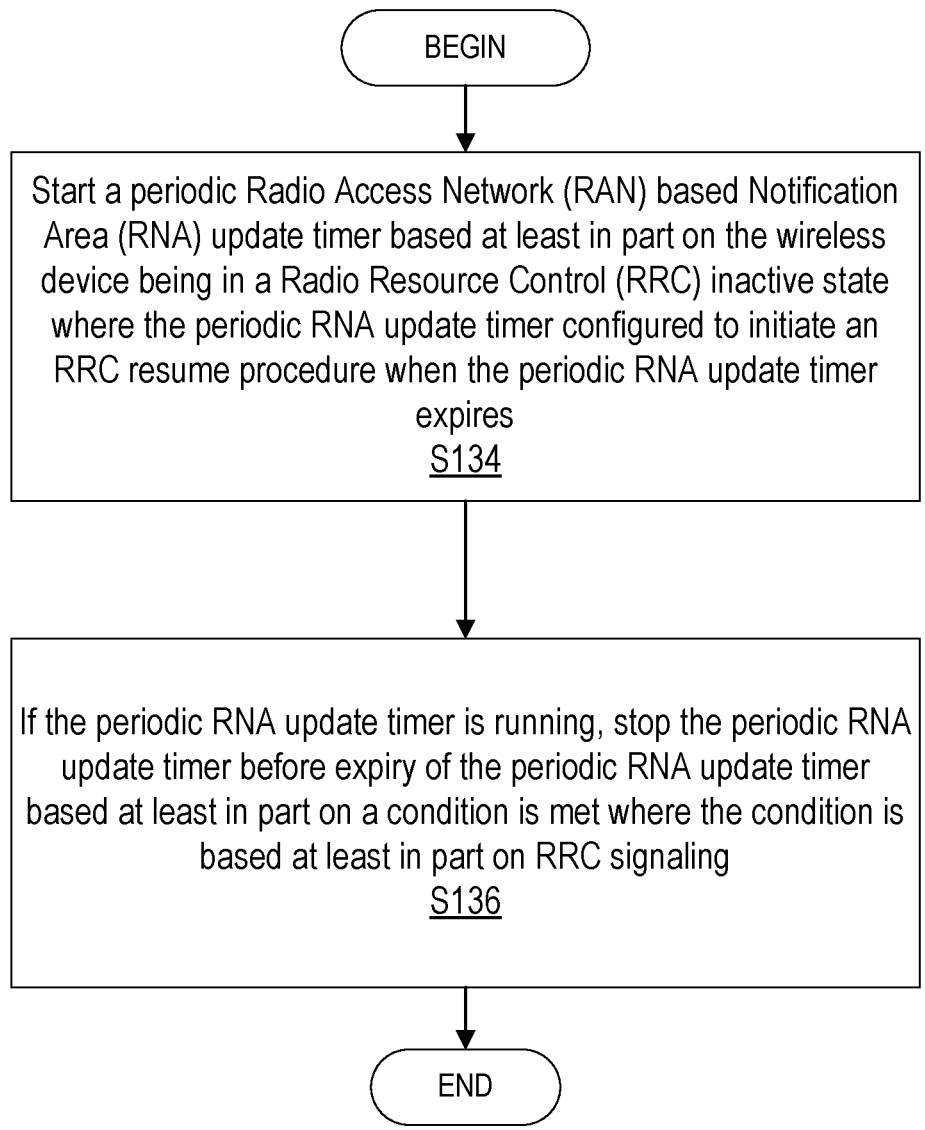
FIG. 12 is a flowchart of an exemplary process in a wireless device according to one or more embodiments of the present disclosure.

FIG. 12 is a flowchart of an exemplary process in a wireless device 22 according to some embodiments of the disclosure. One or more Blocks and/or functions performed by wireless device 22 may be performed by one or more elements of wireless device 22 such as by update timer control unit 34 in processing circuitry 84, processor 86, radio interface 82, etc. In one or more embodiments, wireless device such as via one or more of processing circuitry 84, processor 86, update timer control unit 34 and radio interface 82 is configured to start (block S134) a periodic Radio Access Network (RAN) based Notification Area (RNA) update timer based at least in part on the wireless device 22 being in a Radio Resource Control (RRC) inactive state where the periodic RNA update timer is configured to initiate an RRC resume procedure when the periodic RNA update timer expires, as described herein. In one or more embodiments, wireless device such as via one or more of processing circuitry 84, processor 86, update timer control unit 34 and radio interface 82 is configured to if the periodic RNA update timer is running, stop (block S136) the periodic RNA update timer before expiry of the periodic RNA update timer based at least in part on a condition being met where the condition is based at least in part on RRC signaling, as described herein.

According to one or more embodiments, the condition being met corresponds to the wireless device 22 receiving, in response to an RRC Resume Request message, an RRC Setup message for triggering transition of the wireless device 22 to an RRC connected state. According to one or more embodiments, the condition being met corresponds to the wireless device 22 receiving, in response to an RRC Resume Request message, an RRC suspend message where the RRC suspend message indicates that the wireless device 22 is to remain in an RRC inactive state. According to one or more embodiments, the processing circuitry 84 is further configured to, if the received RRC suspend message includes a configuration associated with the periodic RNA update timer, restart the periodic RNA update timer according at least to the configuration in the received RRC suspending message.

According to one or more embodiments, the processing circuitry 84 is further configured to, if the received RRC suspend message fails to include a configuration associated with the periodic RNA update timer, restart the periodic RNA update timer according to a previous configuration. According to one or more embodiments, the condition being met corresponds to the wireless device receiving, in response to an RRC Resume Request message, an RRC Release message triggering transition of the wireless device 22 to an RRC idle state. According to one or more embodiments, the condition being met corresponds to the wireless device 22 failing to receive, after sending an RRC Resume Request message, one of an RRC Resume message, RRC Suspend message or an RRC Release message. According to one or more embodiments, the condition being met corresponds to the wireless device 22 entering an RRC idle state from an RRC inactive state without transitioning through an RRC connected state. According to one or more embodiments, the start of the periodic RNA update timer is triggered upon entering the RRC inactive state.

Figure 13:
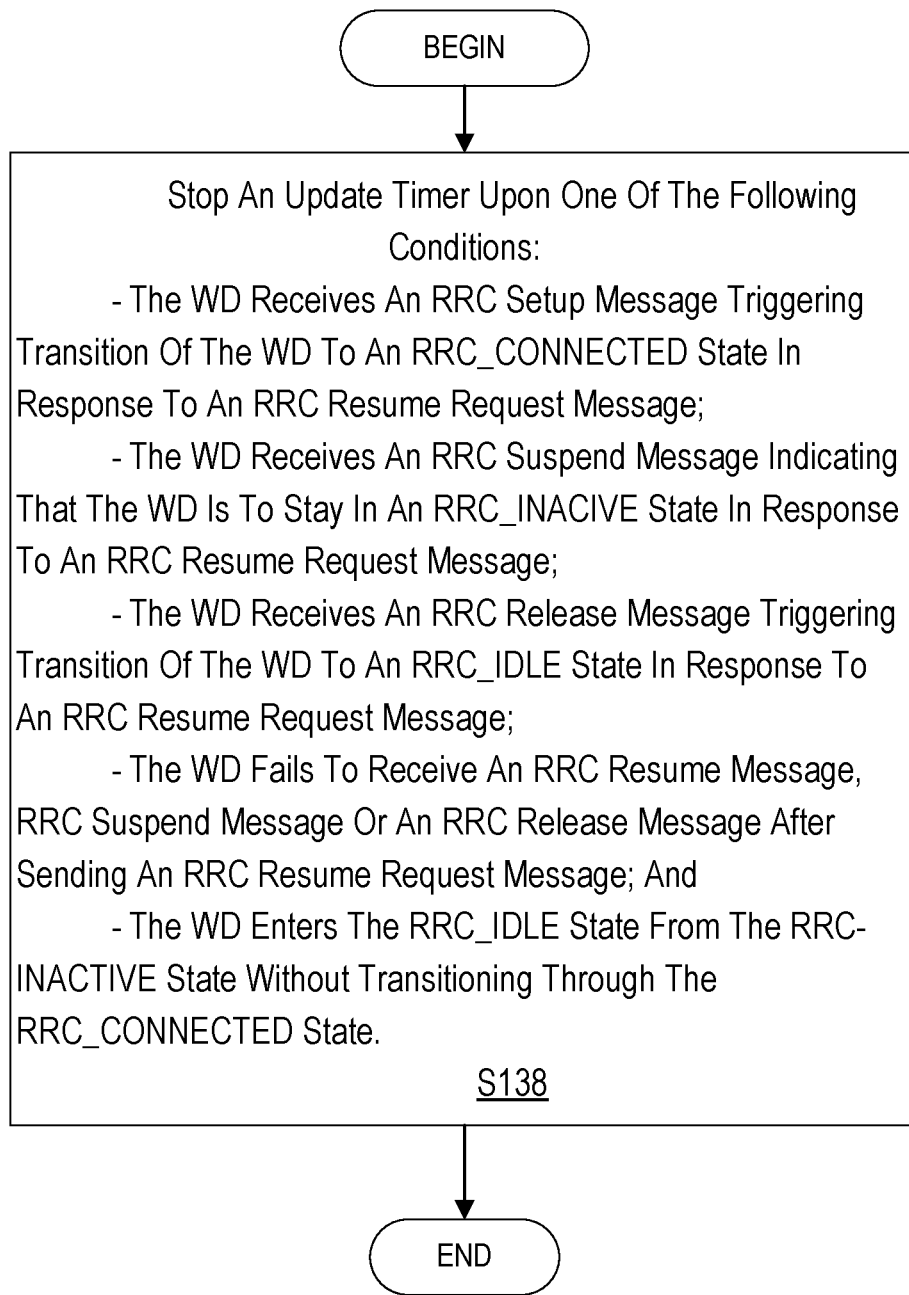
FIG. 13 is a flowchart of another exemplary process in a wireless device according to one or more embodiments of the present disclosure.

FIG. 13 is a flowchart of another exemplary process in a wireless device 22 according to some embodiments of the present disclosure. One or more Blocks and/or functions performed by wireless device 22 may be performed by one or more elements of wireless device 22 such as by update timer control unit 34 in processing circuitry 84, processor 86, radio interface 82, etc. The process, performed by wireless device 22 such as via one or more of processing circuitry 84, processor 86, update timer control unit 34 and radio interface 82, includes stopping (block S138) an update timer upon one of the following conditions: the WD 22 receives an RRC Setup message triggering transition of the WD 22 to an RRC_CONNECTED state in response to an RRC Resume request message; the WD 22 receives an RRC Suspend message indicating that the WD 22 is to stay in an RRC_INACTIVE state in response to an RRC Resume Request message; the WD 22 receives an RRC Release message triggering transition of the WD 22 to an RRC_IDLE state in response to an RRC Resume Request message; the WD 22 fails to receive an RRC Resume message, an RRC Suspend message or an RRC Release message after sending an RRC Resume Request message; and the WD 22 enters the RRC_IDLE state from the RRC_INACTIVE state without transitioning through the RRC_CONNECTED state.

Figure 14:
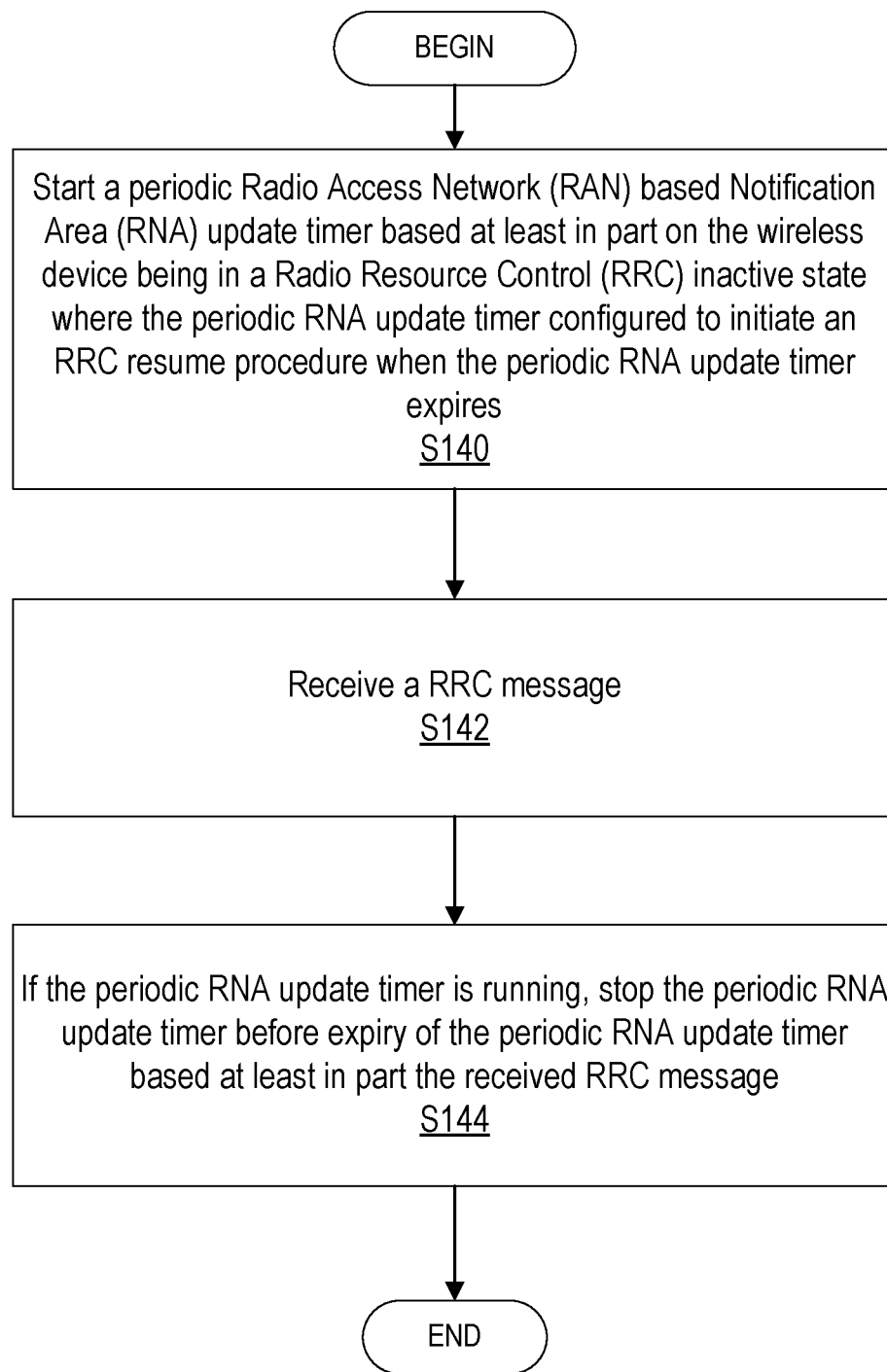
FIG. 14 is a flowchart of yet another exemplary process in a wireless device according to one or more embodiments of the present disclosure.

FIG. 14 is a flowchart of an exemplary process in a wireless device 22 according to some embodiments of the present disclosure. One or more blocks and/or functions performed by wireless device 22 may be performed by one or more elements of wireless device 22 such as by update timer control unit 34 in processing circuitry 84, processor 86, radio interface 82, etc. In one or more embodiments, wireless device such as via one or more of processing circuitry 84, processor 86 and radio interface 82 is configured to start (block S140) a periodic Radio Access Network (RAN) based Notification Area (RNA) update timer based at least in part on the wireless device being in a Radio Resource Control (RRC) inactive state where the periodic RNA update timer is configured to initiate an RRC resume procedure when the periodic RNA update timer expires. In one or more embodiments, wireless device such as via one or more of processing circuitry 84, processor 86 and radio interface 82 is configured to receive (block S142) a RRC message. In one or more embodiments, wireless device such as via one or more of processing circuitry 84, processor 86 and radio interface 82 is configured to, if the periodic RNA update timer is running, stop (block S144) the periodic RNA update timer before expiry of the periodic RNA update timer based at least in part the received RRC message.

Having described the general process flow of arrangements of the disclosure and having provided examples of hardware and software arrangements for implementing the processes and functions of the disclosure, the sections below provide details and examples of arrangements for implementing embodiments of the disclosure and for handling of a periodic RNA update timer.

In a first embodiment, upon receiving an RRC Setup message (ordering the WD 22 to enter the RRC_CONNECTED state), in response to an RRC Resume Request, the WD 22, such as via processing circuitry 84, stops the periodic RNA update timer (T380). It is noted that, below actions indicated as taken or performed by the WD 22 may be performed or controlled by processing circuitry 84.

In a second embodiment, upon receiving an RRC Suspend message (or any other equivalent message indicating the WD 22 may stay in the RRC_INACTIVE state), in response to an RRC Resume Request, the WD 22 stops the periodic RNA update timer (T380) if running. That can occur, for example, when the WD 22 triggers the Resume procedure due to mobility RNA, early UL data transmissions or any other reason that may trigger a Resume procedure.

In a third embodiment, upon receiving an RRC Release message (or any other equivalent message indicating the WD 22 may go to the RRC_IDLE state), in response to an RRC Resume Request, the WD 22 stops the periodic RNA update timer (T380) if running. That can occur, for example, when the WD 22 triggers the Resume procedure due to a mobility RNA, early UL data transmissions or any other reason that may trigger a Resume procedure.

In a fourth embodiment, upon failing to receive an RRC Resume or RRC Suspend or RRC Release message (i.e., failure of timer T300X expiry due to bad UL coverage or bad DL coverage) after sending an RRC Resume Request message, the WD 22 stops the periodic RNA update timer, if running. That can occur, for example, when the WD 22 triggers the Resume procedure due to a mobility RNA, early UL data transmissions or any other reason that may trigger a Resume procedure. The precise moment that the WD 22 stops T380 may be the detection of the problem, as described by the expiry of T300X, or by a subsequent action that is specified, such as upon the WD 22 entering the RRC_IDLE state and/or notifying higher layers of the failure.

In a fifth embodiment, upon entering the RRC_IDLE state from the RRC_INACTIVE state without necessarily going through the RRC_CONNECTED state (e.g., based on any INACTIVE to IDLE mechanism, such as a configured timer that upon expiry makes the WD 22 release its AS context and transit from the RRC_INACTIVE state to the RRC_IDLE state), the WD 22 stops the periodic RNA update timer if running (T380).

In a sixth embodiment, upon entering the RRC_IDLE state from the RRC_INACTIVE state without necessarily going through the RRC_CONNECTED state (e.g., triggered by the reception of a CN paging while in the RRC_INACTIVE state), the WD 22 stops the periodic RNA update timer if running (T380).

In a seventh embodiment, upon receiving an RRC Suspend message (or any other equivalent message indicating the WD 22 may stay in the RRC_INACTIVE state), in response to an RRC Resume Request, the WD 22 stops the periodic RNA update timer (T380) if running (as described in the second embodiment) and, in addition, performs at least one of the following actions:

- If the Suspend message (or equivalent) contains a configuration for the periodic RNA update timer (T380), the WD 22 deletes the previous timer value, the WD 22 stores the received value and the WD 22 starts the timer T380 according to the new value;
- If the Suspend message (or equivalent) does not contain a configuration for the periodic RNA update timer (T380), the WD 22 re-starts the timer T380 according to the stored value;
- If the Suspend message (or equivalent) does not contain a configuration for the periodic RNA update timer (T380), in a different variant, the WD 22 deletes the previous timer value;
- For these different actions, there could be some flags from the network in the Suspend message (or equivalent) indicating re-start, deletion of stored values, etc.
- In some non-limiting embodiments, these may also be implemented via reed codes, so that upon receiving new values for a stored parameter, the WD 22 overrides the previously stored parameter and applies the new values when convenient, upon receiving the message.

Implementation of the proposed embodiments in the NR RRC specifications (and some variants of some of them) are discussed below Reception of the RRCSetup by the WD 22

The WD 22 may perform the following actions upon reception of the RRCSetup:
- if the RRCSetup is received in response to an RRCResumeRequest:
  a) discard the stored WD 22 (access stratum) AS context and I-radio network temporary identifier (RNTI);
  b) indicate to upper layers that the RRC connection resume state is the fall back state;
- perform the cell group configuration procedure in accordance with the received masterCellGroup and as specified in wireless communication standards such as in 3GPP TS 38.331 v15.1.0. and/or 3GPP TS 36.331 v15.1.0., section 5.3.5.5;
- perform the radio bearer configuration procedure in accordance with the received radioBearerConfig and as specified in wireless communication standards such as in 3GPP TS 38.331 and/or 3GPP TS 36.331 v15.1.0., section 5.3.5.6;
- if stored, discard the cell reselection priority information provided by the idleModePriorities or inherited from another RAT;

Note that idleModePriorities can also be applied for WD 22s entering RRC_INACTIVE. And if so, the name of the information element (IE) could be changed. The process may continue as follows:
- stop timer T300 or T300X if running;

Note that there may be a need to define WD 22 actions related to access control timers (equivalent to T302, T303, T305, T306, T308 in LTE), e.g., informing upper layers if a given timer is not running.

- stop timer T320, if running;
- stop timer T380 (periodic RNA update timer), if running;
- enter the RRC_CONNECTED state;
- stop the cell re-selection procedure;

Note that it may be redundant to state that the cell re-selection is stopped (similar to the reception of RRCResume). Similarly, it may redundant to state that the WD 22 may continue performing cell reselection upon transmitting an RRCSetupRequest or RRCResumeRequest message. The process may continue as follows:
- consider the current cell to be the primary cell (PCell);
- set the content of RRCSetupComplete message as follows:
  a) if the RRCSetup is received in response to an RRCResumeRequest:
    i) if upper layers provide an 5G-S-TMSI:
      A) set the ng-5G-S-TMSI to the value received from upper layers;
    b) set the selectedPLMN-Identity to the PLMN selected by upper layers (as described in wireless communication standards such as in 3GPP TS 24.501 v1.0.0.) from the public land mobile networks (PLMNs) included in the plmn-IdentityList in SystemInformationBlockType1;
    c) if upper layers provide the 'Registered Access and Mobility Management Function (AMF)':
      i) include and set the registeredAMF as follows:
        A) if the PLMN identity of the 'Registered AMF' is different from the PLMN selected by the upper layers:
          I) include the plmnIdentity in the registeredAMF and set it to the value of the PLMN identity in the 'Registered AMF' received from upper layers;
        B) set the amf-Region, amf-SetId, amf-Pointer to the value received from upper layers;
      ii) include and set the guami-Type to the value provided by the upper layers;

In some embodiments, the guami-Type may be included and set in the above-mentioned condition.
    d) if upper layers provide one or more single network slice selection assistance information (S-NSSAI) (as described in wireless communication standards such as in 3GPP TS 23.003 v15.3.0.):
      i) include the s-nssai-list and set the content to the values provided by the upper layers;
    e) set the dedicatedInfoNAS to include the information received from upper layers, i.e., communication layers;
- submit the RRCSetupComplete message to lower layers for transmission, upon which the procedure ends the current cell to be the PCell;

Reception of the RRCSuspend by the WD 22

(Note that RRCRelease may be used instead, e.g., with suspend indicator).

The WD 22 may:
- delay the following actions defined in this sub-clause X ms from the moment the RRCSuspend message was received or optionally when lower layers indicate that the receipt of the RRCSuspend message has been successfully acknowledged, whichever is earlier;

The value of X may be configurable, or fixed to 60 ms as in LTE, etc.).
- if the RRCSuspend message includes the idleModeMobilityControlInfo:
  a) store the cell reselection priority information provided by the idleModeMobilityControlInfo;

b) if the T320 is included:
   i) start timer T320, with the timer value set according to the value of T320;
else:
   a) apply the cell reselection priority information broadcast in the system information;
store the following information provided by the network: resumeIdentity, nextHopChainingCount, ran-PagingCycle and ran-NotificationAreaInfo;
re-establish radio link control (RLC) entities for all signalling radio bearers (SRBs) and dedicated radio bearers (DRBs);
reset MAC;
except if the RRCSuspend message was received in response to an RRCResumeRequest:
   a) store the WD 22 AS Context including the current RRC configuration, the current security context, the packet data convergence protocol (PDCP) state including robust header compression (ROHC) state, Cell-radio network temporary identifier (RNTI) used in the source PCell, the cellIdentity and the physical cell identity of the source PCell;
suspend all SRB(s) and DRB(s), except SRB0;
stop timer T380, if running and delete any stored value for the periodic RNA update timer;
start timer T380, with the timer value set to periodic-RNAU-timer;
indicate the suspension of the RRC connection to upper layers;
configure lower layers to suspend integrity protection and ciphering;
enter RRC_INACTIVE and perform procedures as specified in 3GPP TS 38.304 v1.0.1

T300X Expiry or Integrity Check Failure from Lower Layers while T300X is Running The WD 22 may:
if timer T300X expires or upon receiving Integrity check failure indication:
perform the actions upon going to RRC_IDLE as specified in wireless communication standards such as in 3GPP TS 38.331 v1.0.1. and/or 3GPP TS 36.331 v15.1.0., section 5.3.11, with release cause RRC Resume failure;

WD Actions Upon Going to RRC_IDLE

The WD 22 may:
reset MAC;
stop all timers that are running including timer T380, except T320;
discard any stored AS context, I-RNTI, ran-PagingCycle and ran-NonficationAreaInfo;
release all radio resources, including release of the RLC entity, the medium access control (MAC) configuration and the associated packet data convergence protocol (PDCP) entity for all established resource blocks (RBs);
indicate the release of the RRC connection to upper layers together with the release cause;
enter RRC_IDLE and perform procedures as specified in wireless communication standards such as in 3GPP TS 38.304 v1.0.1, unless going to RRC_IDLE was triggered by reception of the MobilnyFromNRCommand message or by selecting an inter-RAT cell while T311 was running.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device configured to communicate with a network node, the method comprising:
    starting a periodic Radio Access Network (RAN) based Notification Area (RNA) update timer based at least in part on the wireless device being in an inactive state;
    receiving a suspend message while the periodic RNA update timer is still running, the suspend message indicating that the wireless device is to remain in the inactive state and the suspend message comprising a configuration associated with the periodic RNA update timer; and
    stopping the periodic RNA update timer and starting the periodic RNA update timer according to the configuration in the received suspend message.

2. The method of claim 1, further comprising storing an AS context including a current configuration.

3. The method of claim 1, further comprising suspending SRBs and DRBs.

4. The method of claim 1, wherein stopping the periodic RNA update timer comprises deleting one of a stored/previous value and a timer value for the periodic RNA update timer.

5. The method of claim 1, wherein the configuration comprises a timer value associated with the periodic RNA update timer.

6. The method of claim 5, wherein starting the periodic RNA update timer according to the configuration in the received suspend message comprises starting the timer with the timer value associated with the periodic RNA update.

7. The method of claim 6, wherein the timer value is set to periodic-RNAU-timer.

8. The method of claim 1, wherein starting the periodic RNA update timer is triggered upon entering the RRC inactive state.

9. The method of claim 1, further comprising delaying a start of timer T320 from the receipt of the suspend message.

10. A wireless device configured to communicate with a network node, the wireless device comprising processing circuitry configured to:
   start a periodic Radio Access Network (RAN) based Notification Area (RNA) update timer based at least in part on the wireless device being in an inactive state;
   receive a suspend message while the periodic RNA update timer is still running, the suspend message indicating that the wireless device is to remain in the inactive state and the suspend message comprising a configuration associated with the periodic RNA update timer; and
   stop the periodic RNA update timer and starting the periodic RNA update timer according to the configuration in the received suspend message.

11. The wireless device of claim 10, wherein the wireless device further comprises a memory, the memory storing an AS context including a current configuration.

12. The wireless device of claim 10, wherein the processing circuitry is further configured to suspend SRBs and DRBs.

13. The wireless device of claim 10, wherein stopping the periodic RNA update timer comprises deleting one of a stored/previous value and a timer value for the periodic RNA update timer.

14. The wireless device of claim 10, wherein the configuration comprises a timer value associated with the periodic RNA update timer.

15. The wireless device of claim 14, wherein starting the periodic RNA update timer according to the configuration in the received suspend message comprises starting the timer with the timer value associated with the periodic RNA update.

16. The wireless device of claim 15, wherein the timer value is set to periodic-RNAU-timer.

17. The wireless device of claim 10, wherein starting the periodic RNA update timer is triggered upon entering the RRC inactive state.

18. The wireless device of claim 10, wherein the processing circuitry is further configured to delay a start of timer T320 from the receipt of the suspend message.

* * * * *